Figure 1:
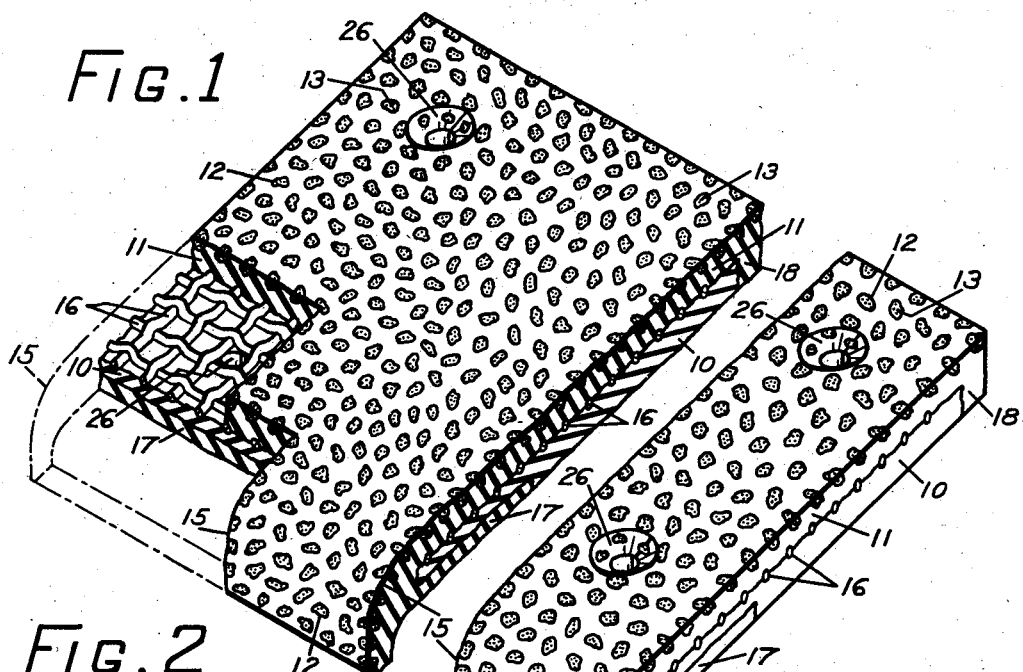

May 19, 1936.    E. VAN DER PYL    2,041,032

SAFETY TREAD

Filed Sept. 5, 1933

WITNESSES
Franklin E. Johnson
W. R. Greenwood

Inventor
EDWARD VAN DER PYL
By Clayton R. Jenks
Attorney

UNITED STATES PATENT OFFICE 2,041,032

SAFETY TREAD

Edward Van der Pyl, Holden, Mass., assignor to Norton Company, Worcester, Mass., a corporation of Massachusetts Application September 5, 1933, Serial No. 688,106

2 Claims. (Cl. 94—5)

This invention relates to safety treads, and more particularly to a non-slip, wear-resistant, hard rubber tread and to a method of making the same.

Heretofore, tread blocks and tiles which were made by embedding in a body of cement, abrasive aggregates composed of crystalline alumina granules bonded by a vitrified ceramic material, have been employed extensively as an anti-slipping flooring or a safety tread. Such cement treads are ordinarily hard and brittle, due to their stone-like nature, and must be mounted to lie perfectly flat on the supporting surface, so that it has been found difficult to satisfactorily mount them on some types of flooring. This is particularly the case when the tiles are used as a supplemental covering over a flooring having an irregular surface, such as an old wooden or iron stair which has become worn to an irregular and non-plane top surface, and the tiles do not rest evenly thereon, but become broken or cracked and loosen from their support because of the unequal distribution of the shocks and strains of traffic.

Rubber tread compositions containing abrasive material have also been proposed heretofore, and one form of such a tread has comprised a body of resilient and flexible rubber having anti-slipping chips incorporated in its surface. Treads of this material are capable of providing an elastic, resilient cushion to absorb the shocks of pedestrian traffic when laid in places where the wear conditions are severe. Such a tread may be attached to a worn-out flooring, such as a stair which has an uneven surface, and will bend and otherwise conform to the extreme irregularities in its supporting surface.

Another proposed form of rubber tread construction has comprised a flexible rubber body containing abrasive grains embedded in the upper surface portion in which the tread is mounted in place and vulcanized to its ultimate support. When small, individual abrasive grains are used in a structure of this type, the rubber bond necessarily forms a comparatively large portion of the tread surface and so is considerably exposed on the surface of the tread and subjected to wear. Furthermore, the rubber is not in itself a hard bonding substance and does not make intimate contact with the very small grains as will hold them permanently in place. Hence, when subjected to the shocks of traffic and the abrasions of pedestrian wear, the elastic rubber yields under this strain, thereby permitting the grains to be torn from the surface and exposes further rubber and grains to similar disintegrating action. As a result, a tread made of individual abrasive grains bonded in flexible, vulcanized rubber has a short life and soon becomes slippery after a short period of wear, and it is otherwise unsatisfactory when subjected to the severe stresses of ordinary pedestrian traffic. Such a tread is also undesirable, since it is fixedly secured to the supporting structure by vulcanization and so is not readily removable when worn out for the substitution of a new safety appliance.

It is accordingly the primary object of this invention to provide an improved safety tread of the replacement type which is highly anti-slipping and wear-resistant, and particularly a non-slip floor or stair tile which possesses the above desirable characteristics and which may be employed as an anti-slipping, wear-resisting tread surface in positions where the wear or the shocks of traffic are high, in which the rubber bond is hard and rigid but yet the tread may be flexed sufficiently to conform to the character of the supporting surface and be removably fastened in place thereto.

Further objects will be readily apparent in the following disclosure.

Figure 2:
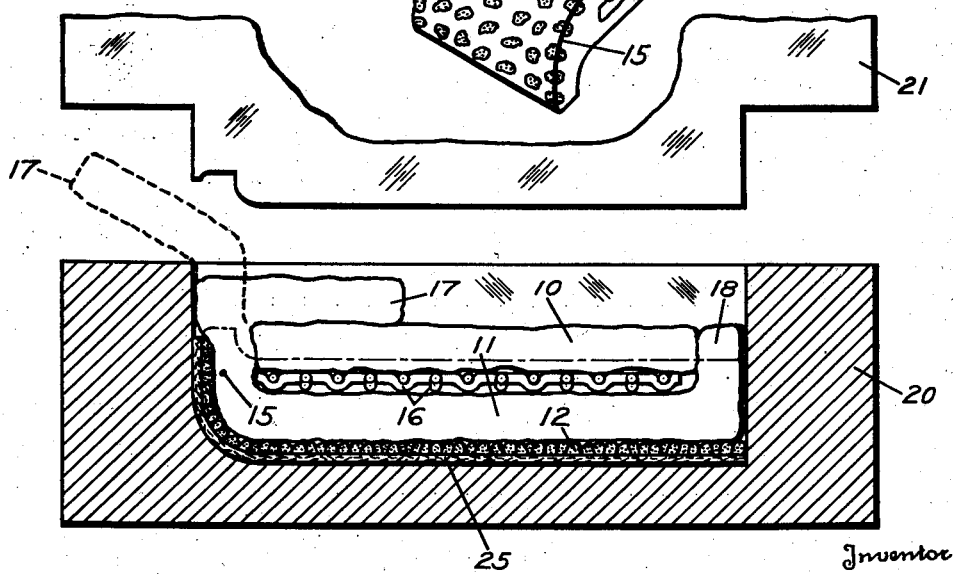

One embodiment of my invention is illustrated in the accompanying drawing, in which:

Fig. 1 is a fragmentary perspective view showing details of construction of a stair tread, with certain portions partly broken away for the purpose of clearness; and Fig. 2 is a cross-sectional view, on an enlarged scale, illustrating diagrammatically one manner of molding a stair tread embodying the invention.

In accordance with my invention, I have provided a tread particularly adapted for stairs and floors which comprises a body portion of hard, tough, completely vulcanized rubber, such as is known under the trade name of "Vulcanite", which has a tread surface and a front nose portion containing hard, wear-resisting, anti-slipping aggregates incorporated therein, such as chips of bonded abrasive grains. In practice, I preferably employ chips of ceramic bonded abrasive granules, such as described in the patent to Jeppson No. 1,371,683 of March 15, 1921, and which consist of an abrasive material of great hardness and high abrasive characteristics, such as crystalline alumina, silicon carbide, emery, corundum or other substance preferably harder than quartz and bonded by a vitrified ceramic material into an integral mass.

In order to make an anti-slipping tread or tile, I incorporate these chips in a plastic mass of rubber compound capable of being vulcanized and converted to a hard, rigid, tough, non-yielding, non-plastic and non-flexible body which is capable of holding the abrasive aggregates firmly in place almost indefinitely under the impact of ordinary pedestrian wear without permitting movement of the chips within the supporting body, yet is sufficiently resilient to withstand the shocks of usage without breaking when mounted on a worn-out, irregular flooring, or in places, such as a street car step where it repeatedly receives blows, and not be broken or cracked by undue stresses applied to it by the impacts of pedestrian traffic. The abrasive aggregates are uniformly distributed and form the major portion of the tread surface or such a proportion of the tread area that they will receive substantially all of the frictional wear and so provide a permanently wear-resisting, anti-slipping surface, and they are securely anchored in the hard rubber bonding material throughout the wearing surface of the tread which continues around the nosing edge. The rubber bonding composition employed should contain the maximum sulfur and be so treated as to form a hard, completely vulcanized rubber and not a partially vulcanized, soft, flexible, resilient rubber which characterizes a partially and incompletely vulcanized rubber composition.

Referring to the drawing, I have shown as one embodiment of my invention a non-slip tread block comprising a non-flexible, non-yieldable backing 10 made of hard, completely vulcanized rubber, which may be of any suitable shape, but preferably as a flat plate or tile having a rectangular, flat, level top surface layer 11 finished in either a plain or colored appearance with anti-slipping abrasive chips or aggregates 12 interspersed and embedded therein to provide an anti-slipping surfacing for pedestrian traffic. The chips 12 are embedded and spaced close enough in the facing 11 to take all of the pedestrian wear, and they are provided with substantially flat faces 13 so as to form a durable, wear-resisting, plane tread surface which is continuous with the flat top surface 11 of the tread and offers no obstruction to foot gear to cause tripping. If the tread is to serve as a stair nosing, the upper front corner of the block or tile where the foot pivots in going down the stairs and where wear is most likely to occur is curved to form a rounded nose 15 having the abrasive aggregates 12 incorporated therein, which serves to enable the nose of the tread to resist wear and to safeguard the downgoing pedestrian traffic. Also, the chips are thickly placed so as to occupy the major portion of the volume of the upper part of the tread in order that the rubber matrix may not be largely exposed to the abrasion of footwear. These chips 12 are of irregular shape and are shown as scattered throughout the top layer of the tread, preferably without reference to any design, although they may be formed in regular shape and placed in suitable pattern, if so desired. Because of their pores and rough, irregular surfaces, the abrasive chips further serve to reinforce the rubber matrix and give additional strength and homogeneity to the molded article, besides enhancing its shock-resisting properties and yielding a hard, strong product. While various sizes of the abrasive chips may be utilized which are selected and graded according to the purposes desired. I preferably use chips which are screened and sized to ordinarily pass through a screen having six meshes to the linear inch and yet be retained by one having eight meshes to the linear inch. The abrasive aggregates are ordinarily composed of from 55 to 75% of aluminum oxide abrasive bonded by a vitrified ceramic material in which the structure of the aggregate is homogeneous, non-glazing, rust-proof and unaffected by freezing, moisture or cleaning compounds.

The bond composition employed for the rubber body material may comprise a rubber matrix consisting of rubber, sulfur, a vulcanization accelerator, with or without suitable coloring pigments and fillers, and may be compounded and proportioned in accordance with standard knowledge in the art to obtain a composition which will mature to a hard, dense, completely vulcanized hard rubber of the type known as "Vulcanite". It is desirable, but not necessary, that such a tread have a modulus of rupture not less than 10,000 lbs. per sq. in. and a modulus of elasticity not more than 260,000 lbs. per sq. in., as determined from bending tests of samples .18"x.35"x3.5".

In order to reinforce the tread body against breakage, I place or embed a reinforcement within the backing 10, and preferably use a perforated or reticulated metal reinforcement, such as a heavy woven wire screen 16 of open mesh, through which screws or bolts may be passed for removably fastening the tread to a supporting surface. The perforations and open mesh of the woven reinforcement also serve to permit the backing material to flow through them while the tread is being manufactured. It is to be understood that various constructions may be employed for this open-meshed or reticulated reinforcement in order to strengthen and reinforce the tread member. The tread should also be of sufficient thickness to resist fracture in service. It will be apparent that the treads may be made in suitable lengths and widths to fit the particular requirements of use.

When colors are used, the face or tread portion 11 may comprise an initial layer made up of a plastic sheet of uncured rubber compound of the desired color in which are embedded the anti-slipping chips 12, the sheet being made long to provide the ends 17 and 18 respectively which are turned or folded over the front and rear ends of a plain, uncolored backing layer 10 prior to the pressing operation in order to prevent the plain backing composition from showing through at the edges of the finished product and provide a colored nosing for the tread. In the case of the plain, uncolored treads, the layer 11 need only be of a length to reach to the bottom edge of the nosing so that the ends 17 and 18 may be eliminated.

As a simple method which may be employed for manufacturing this tread, such as is illustrated in Fig. 2, the molding apparatus may comprise a suitable mold casing 20 and the top pressure member 21. The abrasive chips 12 are first mounted upon paper or other suitable flexible backing material 25, as by means of glue or other adhesive substance, the chips being secured to the backing material by the faces 13 which constitute the tread portion thereof. The sheet carrying the mounted chips is then placed with the abrasive side face up in the mold casing 20. A plastic sheet or strip of uncured, vulcanizable rubber compound 11, either plain or colored, and containing the proper proportions of rubber, sulfur, vulcanization accelerator and fillers, is then laid over the exposed abrasive chips with the end 17 of the material forming the nosing edge disposed as shown in dotted outline in the drawing. The reinforcing screen 16 is then laid on top of this layer of raw rubber, after which a backing layer 10 comprising a second strip of uncured, vulcanizable rubber of the same composition as the first strip, but preferably of plain uncolored material, is applied thereover. If the tread is to be a colored product, the next step is to fold or bend the ends 17 and 18 backwards over the adjacent ends of the backing layer 10. The materials in the mold are then heated and pressure is applied, in accordance with the standard practice, so as to shape and cure the rubber mass to the contour of the mold and thus form the final tread member of hard, vulcanized rubber, as shown in dot-and-dash outline in Fig. 2. The tread may then be removed from the mold and placed between suitable plates, in order that it may keep flat and hold its shape while cooling. The paper backing 25 on which the abrasive chips were initially mounted is then removed in any suitable manner, after which the upper tread surface is cleaned to remove the glue or other adhesive employed to secure the aggregates to the backing. By mounting the layer of abrasive chips on the backing 25, the chips do not become completely embedded and covered by the rubber when the mass is molded, but have their top tread faces 13 protected so that they become exposed when the backing 25 is stripped therefrom.

The treads may be molded to the required dimensions or they may be cut to the desired size and length, as by a grinding wheel. The mounting holes 26 may be formed in the tread during the molding operation or they may be drilled in the molded article to suit the installation requirements for application to the stair or flooring beneath. The holes 26 may be suitably shaped or countersunk to receive the head portion of the fastening screws or bolts employed.

It will, therefore, be seen that a safety tread made in accordance with this invention has a neat and attractive appearance and is highly non-slip on the entire tread surface including the nosing edge to provide a firm and permanent grip on the footgear. This new tread is extremely resistant to wear and is particularly adapted where pedestrian traffic is extremely severe. It is suitable for outdoor use in exposed locations where it permanently maintains its anti-slipping properties when wet and is unaffected by the weather. Such a tread is easily applicable to any existing stair constructions consisting of wood, steel, concrete or stone and can be installed quickly to the supporting surface. The entire width of the stair may be covered by the tread unit, or it may be applied as a nosing on the outer edge of the stair. In the latter case, the area of the stair directly back of the safety tread may be filled with a suitable strip of linoleum, rubber tiling, wood or other suitable material to prevent heel catching. Various modifications of this invention will be apparent, and it is intended that such shall be covered by my invention within the scope of the claims appended hereto.

Having thus described my invention, what I claim as new and desire to secure by Letters Patent is:

1. A safety tread tile comprising a backing of completely vulcanized rubber in a hard, rigid, non-yielding, non-flexible condition, yet capable of being sufficiently resilient to withstand the shocks and stresses of pedestrian traffic, and an anti-slipping surface layer of hard rubber vulcanized to a hard, rigid condition and shaped to provide a plane tread surface and a curved nosing, both of which contain aggregates of abrasive grains bonded by a ceramic bonding material embedded in and constituting such portion of said surface layer as to form the major portion thereof and receive substantially all of the pedestrian wear, and an open mesh metal reinforcement embedded in and adapted to strengthen the tread, said tile having a perforation therethrough for a fastening device.

2. A rubber bonded safety tread comprising a molded body of hard, completely vulcanized rubber having a substantially plane upper tread surface and a rigid, curved, depending front nose portion, and anti-slipping aggregates of bonded abrasive grains embedded in the top surface of the body and nosing having their top face portions exposed and coextensive with said surface and constituting the major portion thereof so as to receive substantially all of the pedestrian wear, said rubber body comprising a rubber backing layer and an upper rubber facing layer containing the abrasive aggregates which is integrally united thereto, and an open mesh reinforcement grid interposed between said layers and embedded in the molded rubber mass, said top anti-slipping tread layer being folded around and under the backing layer at the nose portion of the tread body, whereby the non-abrasive rubber backing is concealed by the top facing and nosing layer containing the anti-slipping abrasive material when the tread is in place on a stair.

EDWARD VAN DER PYL.